(12) United States Patent
Han et al.

(10) Patent No.: US 8,419,286 B2
(45) Date of Patent: Apr. 16, 2013

(54) HERMETIC COMPRESSOR

(75) Inventors: Jeongmin Han, Changwon (KR);
Jaechan An, Changwon (KR);
Hongseok Seo, Changwon (KR);
Keunju Lee, Changwon (KR)

(73) Assignee: LG Electronics Inc., Seoul (KR)

( * ) Notice: Subject to any disclaimer, the term of this patent is extended or adjusted under 35 U.S.C. 154(b) by 197 days.

(21) Appl. No.: 13/113,654

(22) Filed: May 23, 2011

(65) Prior Publication Data

US 2011/0286865 A1 Nov. 24, 2011

(51) Int. Cl.
*F16C 3/14* (2006.01)
*F04B 35/00* (2006.01)

(52) U.S. Cl.
USPC ..................... 384/371; 417/423.13

(58) Field of Classification Search .......... 384/286–289, 384/322, 371, 397, 129; 416/174; 417/432.12, 417/423.13
See application file for complete search history.

(56) References Cited

U.S. PATENT DOCUMENTS

| | | |
|---|---|---|
| 6,743,347 B2 * | 6/2004 | Jeong ............................ 205/333 |
| 2003/0031576 A1 * | 2/2003 | Fushiki et al. ............... 418/55.5 |
| 2004/0101428 A1 * | 5/2004 | Shibamoto et al. .......... 418/55.2 |

* cited by examiner

*Primary Examiner* — Phillip A Johnson
(74) *Attorney, Agent, or Firm* — KED & Associates LLP

(57) ABSTRACT

A compressor has a rotation shaft in a hermetic container, and first and second bearings to support the shaft in the container. A tolerance between the second bearing and the rotation shaft and a tolerance between the first bearing and the rotation shaft are different, so as to cause hydrodynamic lubrication to occur at one of the first or second bearings.

18 Claims, 3 Drawing Sheets

HERMETIC COMPRESSOR

CROSS-REFERENCE TO RELATED APPLICATIONS

Pursuant to 35 U.S.C. §119(a), this application claims the benefit of and right of priority to Korean Application No. 10-2010-0048252 filed on May 24, 2010, the contents of which are incorporated herein by reference.

BACKGROUND

1. Field

One or more embodiments described herein relate to a compressor.

2. Background

In general, a hermetic compressor is provided with a drive motor generating a driving force in an inner space of a hermetic container, and a compressor mechanism operated in combination with the drive motor to compress refrigerant. Furthermore, the hermetic compressor may be classified as a reciprocating type, scroll type, or vibration type. The scroll type and/or vibration type operate based on rotational force of the drive motor, and the vibration type operates based on a reciprocating motion of the drive motor.

The drive motor of a hermetic compressor which operates based on rotational force includes a shaft which transfers rotational force to the compressor mechanism. For instance, the drive motor of a rotary type hermetic compressor (e.g., a rotary compressor) may include a stator fixed to the hermetic container, a rotor inserted into the stator with a predetermined air gap to be rotated by interaction with the stator, and a rotation shaft combined with the rotor to transfer a rotational force of the rotor to the compressor mechanism.

Furthermore, the compressor mechanism may include a compressor mechanism for inhaling, compressing, and discharging refrigerant while rotating within a cylinder, and a plurality of bearing members supporting the compressor mechanism while at the same time forming a compression space together with the cylinder. The bearing members are arranged at a side of the drive motor to support the rotation shaft.

Various attempts have been made to enhance the efficiency of a compressor. Most of these attempts involves changing a shape or material of one or more elements of the compressor or modifying the overall structure of the compressor. These attempts have been costly, often requiring new equipment to be installed in the production facility.

Moreover, in recent years, a compressor has been introduced in which bearings are provided at both upper and lower ends of the rotation shaft to minimize the vibration of the compressor. This has produced a number of drawbacks.

For example, the bearings increases cause an increase in the contact area with the rotation shaft, which necessarily results in an increase of friction loss. Because of this loss, the operation speed of the compressor must be increased to compensate. All of these drawbacks reduce operating efficiency.

DETAILED DESCRIPTION

Various factors have an effect on lubrication performance of bearings used in a compressor. Taking the example of a journal bearing those factors include viscosity ($\eta$) of a lubricant, a number (N) of rotations of the rotating shaft, and a pressure (P) per unit area applied to the rotation shaft may be taken into consideration as the relatively important factors.

The lubrication type of a journal bearing may be classified as follows.

Hydrodynamic Lubrication.

Hydrodynamic lubrication refers to a case where the contact surface is completely separated by lubricant. In this case, all the loads acting on the contact surface are supported by hydraulic pressure generated by a relative movement of the contact surface. Accordingly, the abrasion of the contact surface is very small and friction loss is made only within a lubrication film. The minimum thickness at the time of hydraulic lubrication is about 0.008-0.020 mm, and the friction coefficient is in the range of 0.002-0.01.

Mixed-Film Lubrication.

Mixed-film lubrication refers to lubrication in which intermittent contact of the protrusions on the contact surface is mixed with partial hydrodynamic lubrication. Here, the friction coefficient is in the range of 0.004-0.10 and it is accompanied by a little abrasion of the contact surface.

Boundary Lubrication.

Boundary lubrication refers to lubrication in which lubricant oil is continuously supplied to the contact surface while continuous and heavy surface contact occurs, thereby forming a surface film capable of reducing friction and abrasion on the contact surface. In this case, the friction coefficient is in the range of 0.05-0.20.

Among the foregoing types of lubrication, when in hydrodynamic lubrication state, friction loss can be minimized thereby maximizing efficiency. Furthermore, what type of lubrication is carried out among the types of lubrication may be determined by the aforementioned factors.

Figure 1:
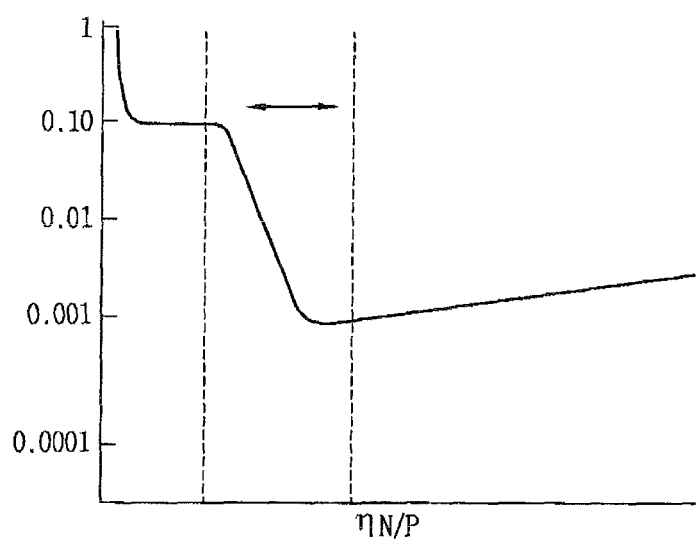
FIG. 1 shows a graph of a Stribeck curve at a journal bearing.
Figure 2:
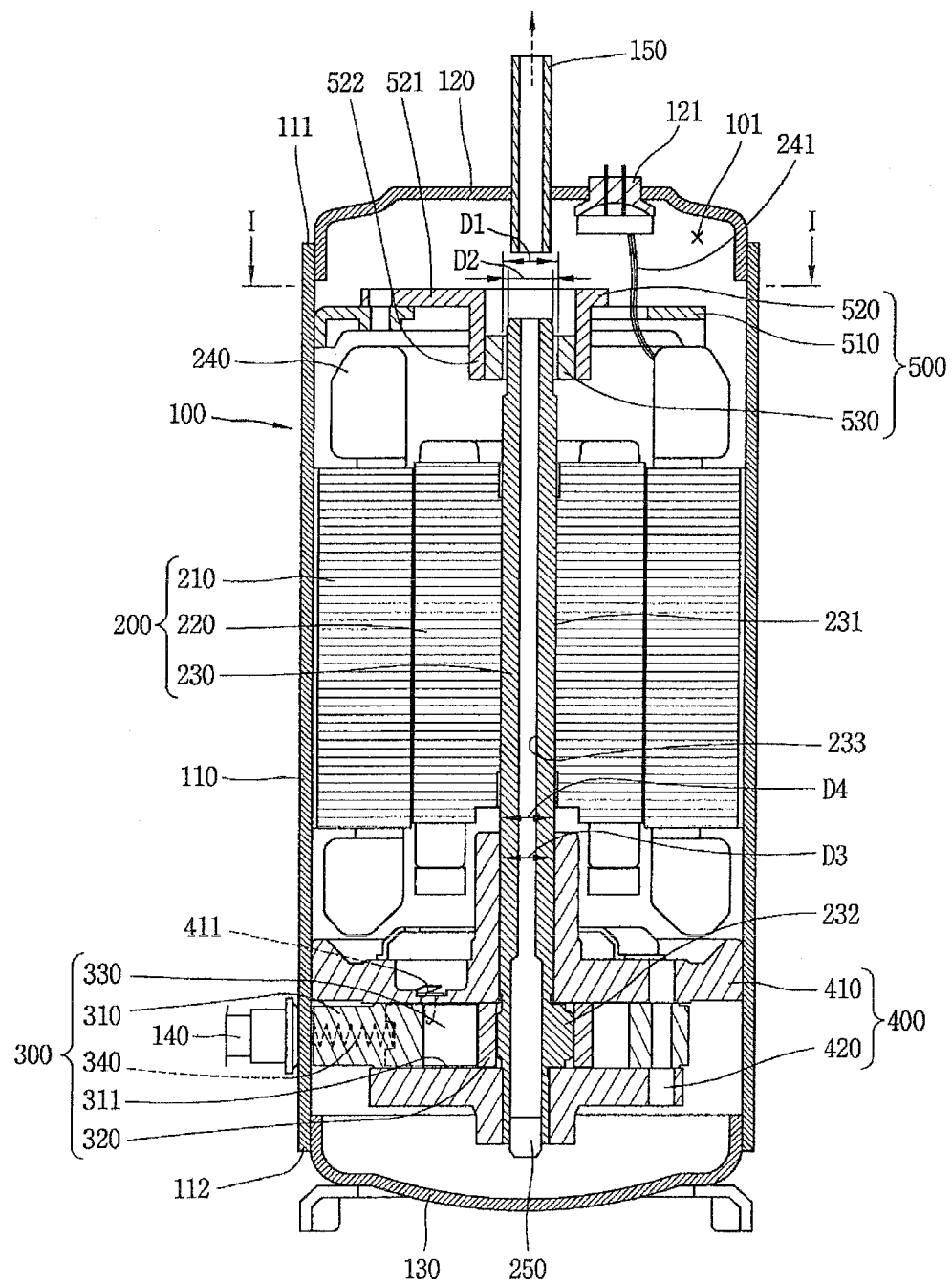
FIG. 2 shows one embodiment of a hermetic compressor.

FIG. 2 shows a Stribeck curve that exhibits a relationship between friction coefficient and the factors of viscosity, rotation number, and pressure. In the Stribeck curve, $\eta N/P$ is called a bearing characteristic value. The effect of the bearing characteristic value on lubrication performance will be described as follows.

Viscosity.

As viscosity increases, the rotation speed for making hydrodynamic lubrication at a given load is reduced. However, a viscosity higher than required for performing hydrodynamic lubrication may increase power required for shearing an oil film while rotating the shaft and thus increases friction.

Rotation Speed.

As rotation speed increases, the viscosity for performing hydrodynamic lubrication is reduced. However, once hydrodynamic lubrication has been carried out, then increasing rotation speed is accompanied with the increased work of shearing an oil film and thus increases friction.

Bearing Unit Load.

As bearing unit load decreases, the rotation speed and viscosity required for performing hydrodynamic lubrication is reduced. However, a certain amount of force is required for shearing an oil film, and thus frictional force is not reduced even when load is continuously reduced. So, frictional force increases.

The viscosity and rotation speed of those factors are determined by the kind of lubricant applied to the compressor and the condition of the system in which the compressor is used, and thus hydrodynamic lubrication can be carried out by obtaining a structure capable of minimizing the bearing unit load, thereby promoting efficiency.

FIG. 2 shows one embodiment of a rotary compressor which includes a drive motor 200 generating a driving force is provided at an upper side of the inner space 101 of the hermetic container 100, and a compressor mechanism 300 compressing refrigerant by power generated from the drive motor 200 is provided at a lower side of the inner space 101 of the hermetic container 100, and a lower bearing 400 and an upper bearing 500 supporting a crankshaft 230 as a rotation shaft which will be described later are provided at a lower side and an upper side of the drive motor 200, respectively.

The hermetic container 100 may include a container body 110 in which the drive motor 200 and the compressor mechanism 300 are provided, an upper cap (hereinafter, a first cap) 120 covering an upper opening end (hereinafter, a first opening end) 111 of the container body 110, and a lower cap (hereinafter, a second cap) 130 covering a lower opening end (hereinafter, a second opening end) 112 of the container body 110.

The container body 110 is formed in a cylindrical shape, and a suction pipe 140 is penetrated and combined with a circumferential surface of the lower portion of the container body 110, and the suction pipe is directly connected to a suction port (not shown) provided in a cylinder 310 which will be described later.

An edge of the first cap 120 is bent to be welded and combined with a first opening end 111 of the container body 110. Furthermore, a discharge pipe 150 for guiding refrigerant discharged from the compressor mechanism 300 to an inner space 101 of the hermetic container 100 to a freezing cycle is penetrated and combined with a central portion of the first cap 120.

An edge of the second cap 130 is bent to be welded and combined with a second opening end 112 of the container body 110.

The drive motor 200 may include a stator 210 shrink-fitted and fixed to an inner circumferential surface of the hermetic container 100, a rotor 220 rotatably arranged at an inner portion of the execution controller 210, and a crankshaft 230 shrink-fitted to the rotator 220 to transfer a rotational force of the drive motor 200 to the compressor mechanism 300 while being rotated therewith. For the stator 210, a plurality of stator sheets are laminated at a predetermined height, and a coil 240 is wound on the teeth provided at an inner circumferential surface thereof.

The rotor 220 is arranged with a predetermined air gap on an inner circumferential surface of the stator 210 and the crankshaft 230 is inserted into a central portion thereof with a shrink-fit coupling and combined to form an integral body.

The crankshaft 230 may include a shaft portion 231 combined with the rotor 220, and an eccentric portion 232 eccentrically formed at a lower end portion of the shaft portion 231 to be combined with a rolling piston which will be described later. Furthermore, an oil passage 233 is penetrated and formed in an axial direction at an inner portion of the crankshaft 230 to suck up oil of the hermetic container 100.

The compressor mechanism 300 may include a cylinder 310 provided within the hermetic container 100, a rolling piston 320 rotatably combined with an eccentric portion 232 of the crankshaft 230 to compress refrigerant while being revolved in a compression space of the cylinder 310, a vein 330 movably combined with the cylinder 310 in a radial direction such that a sealing surface at one side thereof to be brought into contact with an outer circumferential surface of the rolling piston 320 to partition a compression space of the cylinder 310 into a suction chamber and a discharge chamber, and a vein spring 340 formed of a compression spring to elastically support a rear side of the vein 330.

The cylinder 310 is formed in a ring shape, a suction port (not shown) connected to the suction pipe is formed at a side of the cylinder 310, a vein slot 311 with which the vein 330 is slidably combined is formed at a circumferential-direction side of the suction port, and a discharge guide groove (not shown) communicated with a discharge port 411 provided in an upper bearing which will be described later is formed at a circumferential-direction side of the vein slot 311.

Figure 3:
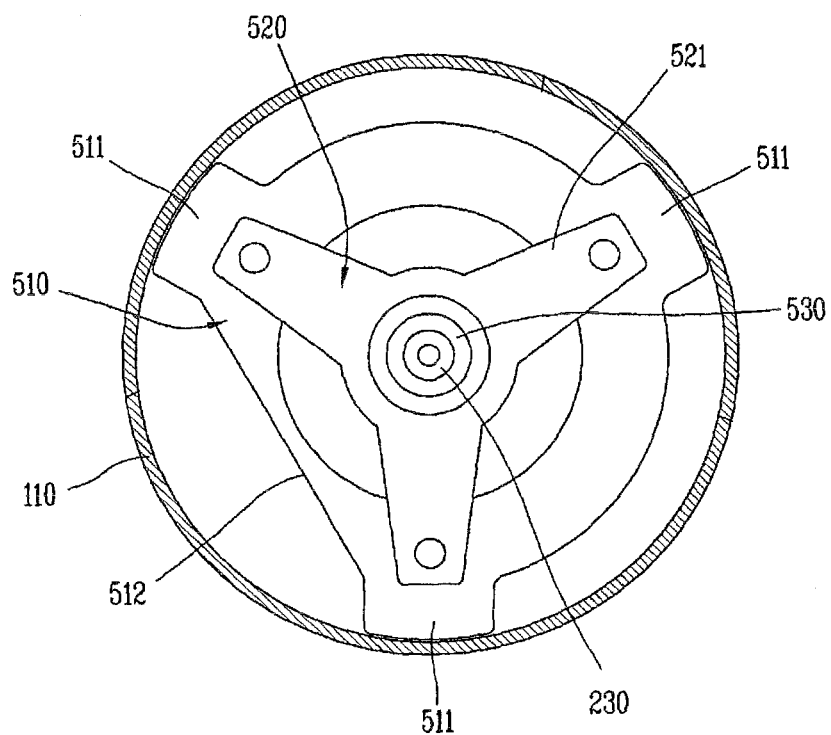
FIG. 3 shows a cross-sectional view along the line I-I of FIG. 2.

The lower bearing 400 may include an upper side bearing 410 welded and combined with the hermetic container 100 while covering an upper side of the cylinder 310 to support the crankshaft 230 in an axial and radial direction, and a lower side bearing 420 welded and combined with the hermetic container 100 while covering an lower side of the cylinder 310 to support the crankshaft 230 in an axial and radial direction. As illustrated in FIGS. 2 and 3, the upper bearing 500 may include a frame 510 welded and combined with an inner circumferential surface of the hermetic container 100 at an upper side of the stator 210, and a housing 520 combined with the frame 510 to be rotatably combined with the crankshaft 230.

The frame is formed in a ring shape, and a fixed protrusion 511 protruded at a predetermined height to be welded to the container body 110 is formed on a circumferential surface thereof. The fixed protrusion 511 is formed to have a predetermined arc angle with an interval of 120 degrees approximately along a circumferential direction.

The housing 520 is formed with support protrusions 521 with an interval of about 120 degrees to support the frame 510 at three points, a bearing protrusion 522 is formed to be protruded downward at a central portion of the support protrusions 521, thereby allowing an upper end of the crankshaft 230 to be inserted and supported. A bearing bush 530 may be combined or a ball bearing may be combined with the bearing protrusion 522. Reference numeral 250 is an oil feeder.

In operation, when power is applied to the stator 210 of the drive motor 200 to rotate the rotor 220, the crankshaft 230 is rotated while both ends thereof is supported by the lower bearing 400 and the upper bearing 500. Then, the crankshaft 230 transfers a rotational force of the drive motor 200 to the compressor mechanism 300, and the rolling piston 320 is eccentrically rotated in the compression space in the compressor mechanism 300. Then, the vein 330 compresses refrigerant while forming a compression space together with the rolling piston 320 to be discharged to an inner space 101 of the hermetic container 100.

At this time, while the crankshaft 230 is rotated at a high speed the oil feeder 250 provided at a lower end thereof pumps oil filled in an oil storage portion of the hermetic container 100, and the oil is sucked up through the oil passage 233 of the crankshaft 230 to lubricate each bearing surface.

Predetermined tolerances are provided between the crankshaft 230 and each bearing. In accordance with one embodiment, when an inner diameter of the bearing bush 530 of the upper bearing 500 is D1, a diameter of the crankshaft 230 is D2 at a location adjacent or near the upper bearing, an inner diameter of the lower side bearing 410 is D3, and a diameter of the crankshaft 230 at an inner portion of the lower side bearing 410 is D4, the value C1 is defined by D1-D2, the value C2 is defined by D3-D4, then the values C1 and C2 are set to satisfy the following condition.

$$0.55 \leq C1/C2 \leq 11.5 \qquad (1)$$

In other words, a tolerance at the upper bearing 500 is set to be 0.55 to 11.5 times greater than a tolerance at the lower side bearing 410, and hydrodynamic lubrication is carried out at the upper bearing 500 in this range.

Example 1

When C1/C2 is set to 0.55, a lubrication state at the upper bearing 500 was checked as follows:
Number of rotation (N): 60 rpm
Oil viscosity ($\eta$): 0.00000000083 Ns/m2
Average load within bearing (Pm): 0.0499 N/m2
Bearing radius (R): 7.15 mm
Upper bearing tolerance (C1): 0.0055 mm
For the above, the Sommerfelt number (S0) is calculated as follows:

$$S0=(R/C)2\eta N/P=1.710$$

Using the obtained Sommerfelt number (S0) described above, an eccentricity of the crankshaft within the upper bearing while being rotated is obtained as:

$$\ln X = C0 + C1 S0 + C2 S0^2 + C3 S0^3 + C4 S0^4,$$

where:
$C0=-6.733511e-2+5.953856e-2*(L/D)-7.877801e-3*(L/D)2$
$C1=0.0173906-4.3371078*(L/D)-0.41195896*(L/D)2$
$C2=2.0091537+0.5112015*(L/D)+4.083148*(L/D)2$
$C3=-6.32445+7.878233*(L/D)-7.09259*(L\cdot D)2$
$C4=4.081927-6.025585*(L/D)+3.665192*(L/D)2$
L: Length of crankshaft
D: Diameter of crankshaft If the eccentricity (X) is obtained using the above equations, then X=1.014, and if the minimum oil film thickness (hm) is obtained using the obtained eccentricity, then hm=C (1−X)=−0.0000774 mm.

Here, when the minimum oil film thickness has a negative (−) value, this means that an oil film cannot be formed since a tolerance between the crankshaft and the bearing is small, and it also means that the shaft cannot be supported by an oil film to be brought into contact with the bearing if load is applied to the shaft. In other words, it means that boundary lubrication is carried out.

However, taking an arithmetic error due to approximation into account, the above value is actually close to zero, and the Sommerfelt number is above 1.7. Thus, it is seen that the compressor has a sufficient condition to perform hydrodynamic lubrication. Accordingly, if C1/C2 is determined to be 0.55, then it means that the compressor is located at a boundary between boundary and hydrodynamic lubrication.

Example 2

When C1/C2 is set to 11.5, the Sommerfelt number (S0) is 0.039 based on the foregoing equations, and the eccentricity (X) is calculated as 0.958. In this case, the minimum oil film thickness (hm) is calculated as 0.0047 mm.

In this case, the Sommerfelt number is relatively low, but the minimum oil film thickness is 4.7 µm and thus a sufficient oil film may be formed between the crankshaft and the bearing. Due to this, the shaft is supported by the oil film even if load is applied to the shaft, and thus the shaft and bearing are not brought into contact with each other. In other words, in this case, it is seen that the compressor falls under a complete lubrication region.

Figure 4:
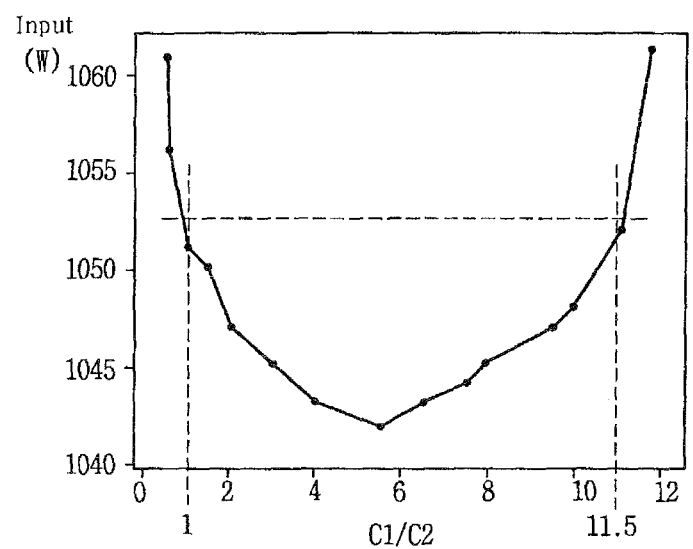
FIG. 4 shows a graph of an input amount based on a C1/C2 ratio.

On the other hand, FIG. 4 is a graph illustrating a variation of an input work (compression work) based on the C1/C2 value. As illustrated in the drawing, when the C1/C2 value is less than 1 or greater than 11.5, then it is seen that input work is rapidly increased. In other words, hydrodynamic lubrication may be carried out at the upper bearing when the Equation 1 is satisfied, but it is advantageous that the C1/C2 value is in the range of 1 to 11.5 when a variation of input work is taken into account.

One or more embodiments provide a hermetic compressor that may reduce or minimize friction loss. The type of friction loss to be reduced or minimized may include friction loss which otherwise would exist is a compressor having added or additional bearings. Moreover, this friction loss may be achieved in accordance with at least one embodiment without changing a structure of the compressor, which reduces costs in large scale production.

In accordance with one embodiment, a hermetic compressor includes a hermetic container; a rotation drive unit provided at an inner portion of the hermetic container; a rotation shaft combined with the rotation drive unit; a compressor mechanism combined with the rotation shaft to inhale and compress refrigerant; a first bearing fixed to the compressor mechanism to support the rotation shaft; and a second bearing fixed to the hermetic compressor to support an end portion located apart from the first bearing on the rotation shaft, wherein when a tolerance between the second bearing and rotation shaft is C1 and a tolerance between the first bearing and rotation shaft is C2, the compressor satisfies the relation of $0.55 \leqq C1/C2 \leqq 11.5$.

In accordance with at least one embodiment, hydrodynamic lubrication can be easily achieved when tolerances at each bearing are not individually specified but two tolerances satisfy a particular relation by observing that the lubrication state at one bearing may have an effect on the lubrication state at the other bearing, between two bearings supporting one rotation shaft.

Taking this into consideration, as a result of an experiment, it was confirmed that smooth lubrication may be achieved (as previously discussed) at an upper bearing if $0.55 \leqq C1/C2 \leqq 11.5$ is satisfied, when a tolerance between the second bearing and rotation shaft is C1 and a tolerance between the first bearing and rotation shaft is C2. If C1/C2 is less than 0.55, then a tolerance between the second bearing and rotation shaft may be too small, thereby causing difficulty in assembly as well as resulting in locking in the bearing.

Moreover, minimum oil film thickness may be reduced and thus hydrodynamic lubrication may not be carried out and it is highly possible to perform boundary lubrication. In particular, the rotation shaft having a crankshaft type generates eccentricity while being rotated, and such eccentricity increases as increasing the length of the rotation shaft. Accordingly, taking the eccentricity of the crankshaft or the like into account, the value of C1/C2 is preferably equal to or greater than 0.55. In other embodiments a different value of the C1/C2 ratio may be used.

On the contrary, when C1/C2 exceeds 11.5, the required amount of lubricant increases due to an increase of the gap though it is included in a hydrodynamic lubrication region. Accordingly, friction coefficient rather increases in an operating region where the supply of lubricant is not smoothly made and thus rapid heating may be generated, thereby causing an abrasion of the rotation shaft.

As a result, in accordance with one embodiment, when C1/C2 is 0.55 to 11.5, smooth lubrication can be achieved to enhance efficiency and reduce friction coefficient, thereby increasing performance and reliability.

In accordance with one embodiment, it may be possible to satisfy the relation of $C1 \geqq C2$. Furthermore, when the compressor includes a third bearing supporting an end portion located near to the first bearing, and a tolerance between the third bearing and rotation shaft is C3, it may be possible to satisfy the relation of $C1 \geq C2 \geq C3$.

Furthermore, the compressor mechanism may include a cylinder configured to inhale and compress refrigerant, and the first and the third bearing may be provided to be closely adhered to both end portions of the cylinder, respectively.

Furthermore, a support frame is additionally provided within the hermetic container, and the second bearing may be fixed to the support frame.

In accordance with another embodiment, a hermetic compressor includes a hermetic container; a rotation shaft rotatably provided within the hermetic container; a compressor mechanism driven by the rotation shaft to compress refrigerant; and at least two bearing configured to support the rotation shaft, wherein when a tolerance between the compressor mechanism and the rotation shaft of the bearing located to be relatively separated from the compressor mechanism is C1, and a tolerance between the compressor mechanism and the rotation shaft of the hearing located to be relatively adjacent to the compressor mechanism is C2, the compressor satisfies the relation of $0.55 \leq C1/C2 \leq 11.5$. Here, it may be possible to satisfy the relation $C2 \leq C1$.

In accordance with another embodiment, a compressor includes a hermetic container: a rotation shaft in the container; and a first bearing and a second bearing to support the rotation shaft in the hermetic container, wherein: when a radial-direction load applied to the first bearing is greater than a radial-direction load applied to the second bearing, when a tolerance between the second bearing and the rotation shaft is C1, and when a tolerance between the first bearing and the rotation shaft is C2, the following relation is satisfied: $0.55 \leq C1/C2 \leq 11.5$.

The ratio of C1/C2 causes hydrodynamic lubrication to occur at one of the first bearing or the second bearing. Moreover, the ratio C1/C2 may cause hydrodynamic lubrication to occur at the second bearing. Also, in accordance with one non-limiting embodiment, $C2 \leq C1$.

In addition, a compressor mechanism for inhaling and compressing a fluid is disposed adjacent to the first bearing, and a transmission mechanism for rotatably driving the compressor mechanism may be disposed adjacent to the second bearing.

In addition, a frame is provided within the hermetic container and wherein the second bearing is fixed to the frame. The frame may be disposed at an upper portion of the transmission mechanism.

In addition, the compressor mechanism may include a rolling piston eccentrically provided at the rotation shaft and a cylinder to accommodate the rolling piston. The cylinder may include a compression space and wherein the first bearing is disposed at an upper portion of the rolling piston and cylinder. In addition, a third bearing may be located at a lower portion of the rolling piston and cylinder.

In addition, the first bearing may be fixed to an inner circumferential surface of the hermetic container. Also, a housing may be provided at a central portion of the frame and wherein the second bearing is provided at an inner portion of a housing. Also, the frame may be fixed to an inner circumferential surface of the hermetic container.

In accordance with another embodiment, a compressor includes a hermetic container; a rotation shaft in the hermetic container; a compressor mechanism driven by the rotation shaft to compress refrigerant; and at least two bearings to support the rotation shaft. When a tolerance between the compressor mechanism and the rotation shaft at a location adjacent a first bearing is C1 and when a tolerance between the compressor mechanism and the rotation shaft at a location adjacent a second bearing is C2, then the following relation is satisfied: $0.55 \leq C1/C2 \leq 11.5$. The first bearing and the second bearing are located at different distances from the compression mechanism. Also, according to one non-limiting embodiment, $C2 \leq C1$.

In addition, the distance between the first bearing and the compression mechanism may be greater than the distance between the second bearing and the compression mechanism.

In accordance with another embodiment, a compressor includes a hermetic container: a rotation shaft in the container; and a first bearing and a second bearing to support the rotation shaft in the hermetic container, wherein a tolerance (C1) between the second bearing and the rotation shaft and a tolerance (C2) between the first bearing and the rotation shaft are different, and wherein said difference causes hydrodynamic lubrication to occur at one of the first bearing or the second bearing.

In addition, the difference between C1 and C2 causes hydrodynamic lubrication to occur at the second bearing. Also, a ratio C1/C2 may be such that $0.55 \leq C1/C2 \leq 11.5$. Also, a radial-direction load applied to the first bearing may be greater than a radial-direction load applied to the second bearing.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of one embodiment may be combined with the features of one or more embodiments.

Although embodiments have been described with reference to a number of illustrative embodiments, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A compressor comprising:
   a hermetic container:
   a rotation shaft in the container; and
   a first bearing and a second bearing to support the rotation shaft in the hermetic container, wherein:
   when a radial-direction load applied to the first bearing is greater than a radial-direction load applied to the second bearing, when a tolerance between the second bearing and the rotation shaft is C1, and when a tolerance between the first bearing and the rotation shaft is C2, the following relation is satisfied: $0.55 \leq C1/C2 \leq 11.5$, wherein $C2 < C1$.

2. The compressor of claim 1, wherein C1/C2 causes hydrodynamic lubrication to occur at one of the first bearing or the second bearing.

3. The compressor of claim 2, wherein C1/C2 causes hydrodynamic lubrication to occur at the second bearing.

4. The compressor of claim 1, wherein a compressor mechanism for inhaling and compressing a fluid is disposed adjacent to the first bearing.

5. The compressor of claim 4, wherein a transmission mechanism for rotatably driving the compressor mechanism is disposed adjacent to the second bearing.

6. The compressor of claim 5, wherein a frame is provided within the hermetic container and wherein the second bearing is fixed to the frame.

7. The compressor of claim 6, wherein the frame is disposed at an upper portion of the transmission mechanism.

8. The compressor of claim 7, wherein the compressor mechanism comprises:
　a rolling piston eccentrically provided at the rotation shaft; and
　a cylinder to accommodate the rolling piston, wherein the cylinder includes a compression space and wherein the first bearing is disposed at an upper portion of the rolling piston and cylinder.

9. The compressor of claim 8, further comprising:
　a third bearing at a lower portion of the rolling piston and cylinder.

10. The compressor of claim 8, wherein the first bearing is fixed to an inner circumferential surface of the hermetic container.

11. The compressor of claim 6, wherein a housing is provided at a central portion of the frame and wherein the second bearing is provided at an inner portion of a housing.

12. The compressor of claim 11, wherein the frame is fixed to an inner circumferential surface of the hermetic container.

13. A compressor comprising:
　a hermetic container;
　a rotation shaft in the hermetic container;
　a compressor mechanism driven by the rotation shaft to compress refrigerant; and
　at least two bearings to support the rotation shaft, wherein:
　when a tolerance between the compressor mechanism and the rotation shaft at a location adjacent a first bearing is C1 and when a tolerance between the compressor mechanism and the rotation shaft at a location adjacent a second bearing is C2, then the following relation is satisfied: $0.55 \leqq C1/C2 \leqq 11.5$, wherein $C2<C1$ and wherein the first bearing and the second bearing are located at different distances from the compressor mechanism.

14. The compressor of claim 13, wherein the distance between the first bearing and the compression mechanism is greater than the distance between the second bearing and the compression mechanism.

15. A compressor comprising:
　a hermetic container:
　a rotation shaft in the container; and
　a first bearing and a second bearing to support the rotation shaft in the hermetic container, wherein a tolerance (C1) between the second bearing and the rotation shaft and a tolerance (C2) between the first bearing and the rotation shaft are different, and wherein said difference causes hydrodynamic lubrication to occur at one of the first bearing or the second bearing.

16. The compressor of claim 15, wherein said difference between C1 and C2 causes hydrodynamic lubrication to occur at the second bearing.

17. The compressor of claim 16, wherein a ratio C1/C2 is such that:

$$0.55 \leqq C1/C2 \leqq 11.5.$$

18. The compressor of claim 17, wherein a radial-direction load applied to the first bearing is greater than a radial-direction load applied to the second bearing.

\* \* \* \* \*

UNITED STATES PATENT AND TRADEMARK OFFICE
CERTIFICATE OF CORRECTION

PATENT NO. : 8,419,286 B2  
APPLICATION NO. : 13/113654  
DATED : April 16, 2013  
INVENTOR(S) : Jeongmin Han et al.

Page 1 of 1

It is certified that error appears in the above-identified patent and that said Letters Patent is hereby corrected as shown below:

On the Title Page, insert Item (30)

--(30)     Foreign Application Priority Data
       May 24, 2010   (KR)         10-2010-0048252--

Signed and Sealed this  
Sixth Day of August, 2013

Teresa Stanek Rea  
*Acting Director of the United States Patent and Trademark Office*